(12) United States Patent
Fischer et al.

(10) Patent No.: US 7,664,479 B2
(45) Date of Patent: Feb. 16, 2010

(54) RECEIVER AND METHOD FOR SCANNING AND RECEIVING WAKE-UP SIGNALS WITH MULTIPLE CONFIGURATIONS

(75) Inventors: Robert Fischer, Kelheim (DE); Thomas Reisinger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 1117 days.

(21) Appl. No.: 10/717,363

(22) Filed: Nov. 19, 2003

(65) Prior Publication Data

US 2004/0124970 A1 Jul. 1, 2004

(30) Foreign Application Priority Data

Nov. 19, 2002 (DE) ................ 102 53 933

(51) Int. Cl.
*H04B 1/16* (2006.01)
(52) U.S. Cl. .................................. 455/343.2
(58) Field of Classification Search ............... 455/343.2
See application file for complete search history.

(56) References Cited

U.S. PATENT DOCUMENTS

| | | | | | |
|---|---|---|---|---|---|
| 4,633,515 | A | * | 12/1986 | Uber et al. ............... | 455/161.3 |
| 4,995,099 | A | * | 2/1991 | Davis ....................... | 340/7.35 |
| 5,790,946 | A | * | 8/1998 | Rotzoll .................... | 455/343.1 |
| 6,041,240 | A | * | 3/2000 | McCarthy et al. ........... | 455/464 |
| 6,369,530 | B2 | * | 4/2002 | Kovach et al. ............... | 318/16 |
| 6,448,892 | B1 | * | 9/2002 | Delaporte ................... | 340/442 |
| 6,469,621 | B1 | | 10/2002 | Vredevoogd et al. ........ | 340/445 |
| 6,604,416 | B2 | * | 8/2003 | Tsujita ...................... | 73/146.5 |
| 6,760,578 | B2 | * | 7/2004 | Rotzoll .................... | 455/343.2 |
| 6,782,250 | B2 | * | 8/2004 | Rainish et al. ........... | 455/343.2 |
| 6,920,342 | B2 | * | 7/2005 | Reiner ...................... | 455/574 |
| 2001/0041551 | A1 | * | 11/2001 | Rotzoll ...................... | 455/343 |
| 2002/0036569 | A1 | * | 3/2002 | Martin ..................... | 340/573.1 |
| 2002/0149477 | A1 | * | 10/2002 | Desai et al. ................. | 340/442 |
| 2002/0177406 | A1 | * | 11/2002 | O'Connor et al. ............. | 455/39 |
| 2003/0164774 | A1 | * | 9/2003 | King et al. ............. | 340/870.28 |
| 2004/0203317 | A1 | * | 10/2004 | Small .......................... | 446/476 |
| 2005/0089004 | A1 | * | 4/2005 | Casaccia et al. ............. | 370/347 |
| 2005/0242923 | A1 | * | 11/2005 | Pearson et al. ............. | 340/5.62 |

FOREIGN PATENT DOCUMENTS

| DE | 197 20 123 A1 | 7/1998 |
|---|---|---|
| DE | 101 07 130 A1 | 8/2001 |

\* cited by examiner

*Primary Examiner*—Matthew D Anderson
*Assistant Examiner*—Bobbak Safaipour
(74) *Attorney, Agent, or Firm*—King & Spalding L.L.P.

(57) ABSTRACT

A method for receiving first signals and further signals using a receiver, the first and further signals differing in at least one of the transmission parameters data rate, modulation type, wake-up criterion, synchronization and threshold value, comprises the steps of: in a first step, in a quiescent mode of the receiver, receiving and searching for a wake-up criterion (A) is performed intermittently using a first preset adjustable configuration of transmission parameters, and when no signal is received and no wake-up criterion (A) is found, the system switches to at least one further configuration and a search is made for a wake-up criterion (B).

14 Claims, 1 Drawing Sheet

RECEIVER AND METHOD FOR SCANNING AND RECEIVING WAKE-UP SIGNALS WITH MULTIPLE CONFIGURATIONS

PRIORITY

This application claims foreign priority of the German application DE 102 53 933.2 filed on Nov. 19, 2002.

TECHNICAL FIELD

The invention relates to a method for receiving first signals and further signals using a receiver.

BACKGROUND OF THE INVENTION

Such methods and receivers are used, for example, in automotive technology in order to receive, with the minimum possible complexity and cost, radio applications in the vehicle having different transmission parameters.

For example, radio applications such as a "keyless or contactless remote-control entry system", usually referred to as RKE (remote keyless entry), and tire-pressure monitoring, usually referred to as Tire Guard, are implemented in the vehicle with different transmission parameters because of different physical conditions and requirements (different range, information content, etc.).

In this case, the differences in the transmission parameters mostly lie in the data rates used and/or the modulation techniques used (amplitude, frequency, phase modulation ASK/FSK/PSK) for transmitting signals.

In principle, the signals from the different radio applications can obviously differ in any transmission parameters such as data rate, modulation type, wake-up criterion, synchronization and threshold value etc.

Solutions known in vehicular technology try to receive and determine a transmission parameter in which the applications differ, and, on successful determination, to switch the receiver into the relevant mode for further receiving.

Disadvantageously, the receiver for determining the transmission parameter is not optimally configured for at least one of the two applications, which introduces performance compromises. For example, if, for different data rates, the data-filter bandwidth is selected to suit the higher data rate, then the receiver is not optimally configured for receiving lower data-rate signals, and corresponding performance losses must be reckoned with.

Furthermore, this method is also highly application specific, which is why a microcontroller is needed to determine the transmission parameter and to then switch over the receiver into the relevant mode. This, however, has the disadvantage of causing an unwanted rise in the quiescent current.

In addition, patent DE 101 07 130 A1 discloses a super-regenerative receiver that requires no application-matched input circuit and that can demodulate the ASK and FSK signals. This receiver has a complex circuit design, however, and has an increased quiescent current consumption because of its quench-controlled sweep circuit.

SUMMARY OF THE INVENTION

Thus the object of the present invention is to create a method for receiving first signals and further signals using just one receiver, and a receiver for carrying out such a method that guarantees optimum reception of the first and further signals in a simple and cost-effective way with low quiescent current consumption.

According to the invention, configurations are saved in the receiver, whereby the receiver can be switched (over) into a given receive mode by setting, calling or loading a relevant configuration. After start-up with a first configuration, the receiver attempts to receive signals using this configuration and to search for a suitable wake-up criterion respectively.

If the signal-reception and/or search remains unsuccessful, the receiver switches over into a different receive mode, for example by calling a different configuration from a memory unit, and tries again to receive signals having these transmission parameters (as given by the configuration) and to search for a suitable (different) wake-up criterion respectively.

In this process, the switchover can occur at the receiver end as a result of the technical design (unsuccessful cycle through the "synchronization" and/or "search for wake-up criterion" states) or after the expiry of a time interval preset by hardware or software (timer, RC-element, counter etc.).

If the reception of signals and/or the search for a suitable wake-up criterion remains unsuccessful, the receiver can be switched over as many times as there are configurations.

Of course, the time intervals for different configurations need not be identical, but can also be included in the configuration as parameters. In addition, it is conceivable that configurations are not called consecutively in a fixed sequence just once in each case, but in any pre-definable sequence and number, or repetition, within a cycle.

In a preferred embodiment according to the invention, after an unsuccessful cycle, a new cycle can be started, beginning with the first configuration.

Since a microcontroller is not needed to implement this method, these cycles can be repeated without limit in a quiescent mode, because the quiescent-current consumption of the method according to the invention is extremely low.

In a further embodiment of the invention, on receiving successfully using a certain configuration and finding a suitable wake-up criterion, a wake-up signal can be output that contains as information the given configuration for the successful reception. This output signal can be used, for example, to switch the receiver or other devices into an active mode, and to continue the further data transmission using the optimum configuration, possibly also bi-directionally.

BRIEF DESCRIPTION OF THE DRAWINGS

The invention is explained in more detail below with reference to an exemplary embodiment shown in the drawing.

In the drawing.

DETAILED DESCRIPTION OF THE PREFERRED EMBODIMENTS

Figure 1:
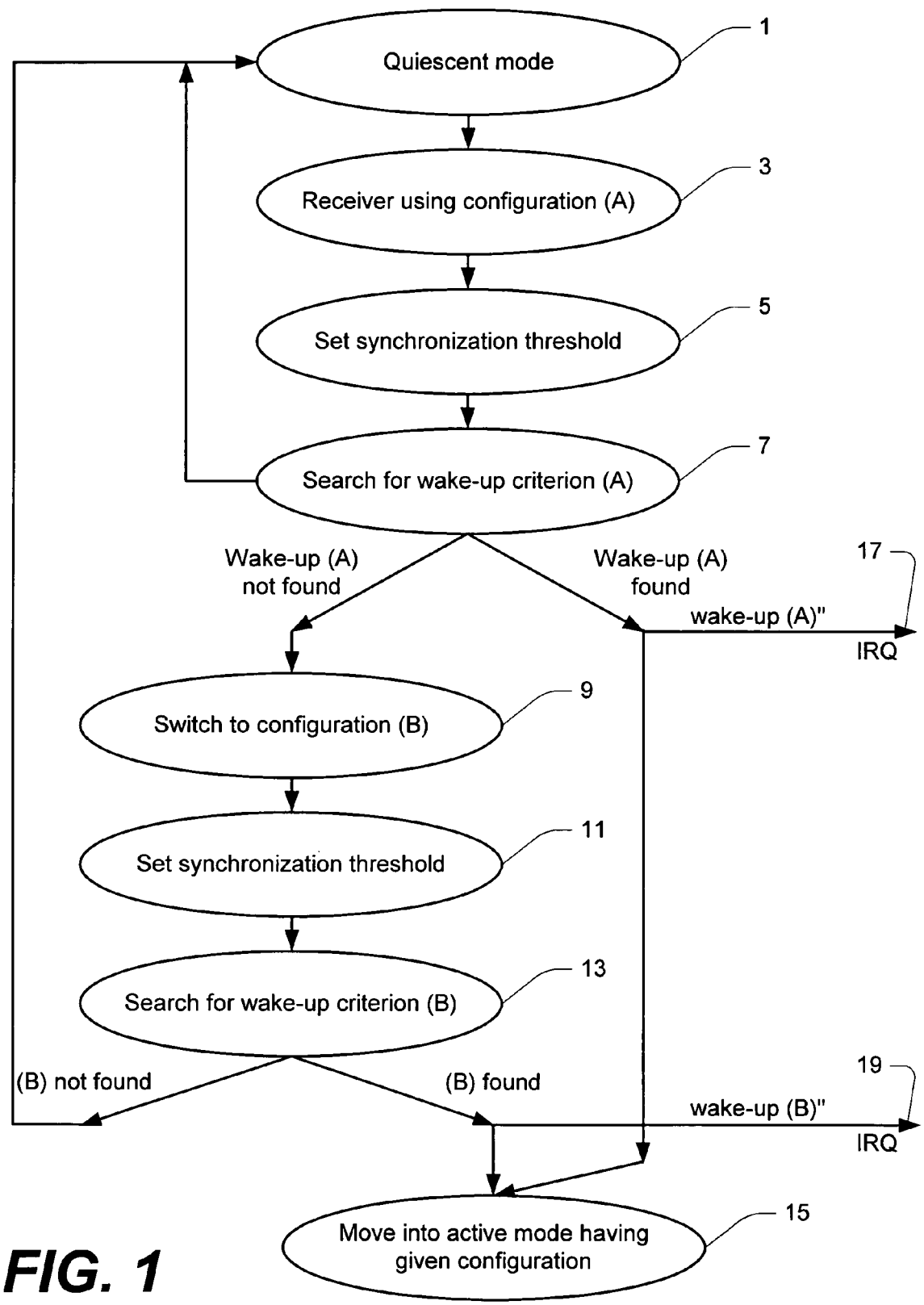
FIG. 1 shows a flow diagram for the method according to the invention.

The flow diagram shown in FIG. 1 explains how the method according to the invention or a receiver according to the invention works from the example of a receiver that is designed for receiving two different signals, for example RKE and Tire Guard. In this case, the RKE signal differs from the Tire-Guard signal at least by a lower data rate of 1 to 2 kbits per second, for example, compared with the Tire-Guard signal having a data rate of 9.6 kbits per second.

If the receiver is in a quiescent mode 1, in which it is preferably receiving for a short time in intervals, then the receiver attempts to receive using configuration A as per step 3, whereby the configuration can contain transmission parameters such as data rate, modulation type, wake-up criterion, synchronization, time information etc.

If the receiver receives a signal using configuration A, it attempts to synchronize itself in order to decode the information contained in the signal, and possibly also (where no threshold value has been set as a parameter in the configuration) to set a threshold value depending on the signal as per step 5.

If, based on configuration A, a wake-up criterion can be found in the signal or in the information it contains as per step 7, then the receiver using the configuration A goes into an active mode as per step 15. Here a wake-up signal can be output additionally, in order to switch other devices such as control devices in the vehicle into an active mode via an interrupt request IRQ at output 17, for example.

If, on the other hand, the search for a wake-up criterion based on configuration A remains unsuccessful, the receiver switches to a configuration B as per step 9, and tries to receive a signal using this configuration having at least one changed transmission parameter, for example a different modulation type and/or different data rate.

If a suitable signal is detected, the receiver attempts to synchronize itself as per step 11, and possibly to set a suitable threshold value.

If in step 13, the signal or the information contained in it contains a wake-up criterion based on configuration B, then the receiver using configuration B goes into an active mode as per step 15, and possibly additionally outputs at output 19 a wake-up signal, for example as interrupt request IRQ, which advantageously also contains the information on the successful receiving configuration, namely B.

If, on the other hand, such a wake-up criterion based on configuration B is not found, the receiver starts again from the beginning, that is with reception using the configuration A, or rather switches back to configuration A.

This method according to the invention, which is described above with reference to the flow diagram, can be implemented by a "self-polling" function without using a microcontroller, so that a minimum possible quiescent current consumption is guaranteed.

Of course, the invention is not limited to the exemplary embodiment shown employing serial polling of the two (radio) applications using two configurations A and B designed to match these applications, but can be expanded to self-polling for a plurality of configurations or a plurality of transmission channels.

Here the configurations can be stored in a storage device, for example a register, permanent memory L, memory card etc., and read out from this again advantageously without using a microprocessor.

In each case, the method according to the invention provides optimum performance for each of the radio applications to be received, in particular an optimum sensitivity, and is hence more precise and possibly faster than determining a specific transmission parameter without an optimum configuration.

The invention claimed is:

1. A method for receiving first signals and further signals using a receiver,
   the first and further signals differing in at least one of the transmission parameters: data rate, modulation type, wake-up criterion, synchronization and threshold, comprising the steps of:
   a) in a first step in a quiescent mode of the receiver, performing receiving and searching for a first wake-up criterion intermittently using a first preset adjustable configuration of transmission parameters tuned for receiving the first wake-up criterion with a first data rate and/or a first modulation type and/or a first threshold; and
   b) when the first wake-up criterion is not received or found in said quiescent mode, switching the receiver to at least one further configuration different from said first preset adjustable configuration and tuned for receiving a second wake-up criterion and searching for the second wake-up criterion, and
   c) if said first or second wake-up criterion has been received in step a) or b), switching the receiver into an active mode with a respectively selected configuration.

2. The method as claimed in claim 1, wherein when no signal is received and no wake-up criterion is found using at least one further configuration, the process starts again with step a).

3. The method as claimed in claim 1, wherein a first device is a remote keyless entry system and a second device is a tire pressure monitoring system.

4. The method as claimed in claim 1, wherein on receiving successfully and finding a wake-up criterion by step a) or b), the receiver goes out of the quiescent mode into an active mode using the configuration that was successful for the reception concerned.

5. The method as claimed in claim 1, wherein the successful reception of a wake-up criterion by step a) or b) must take place within a preset time.

6. A receiver for receiving first signals and further signals comprising a storage device for loading at least two different pre-definable receive configurations, wherein
   the receiver has a quiescent mode in which it intermittently is turned on to receive and search for a first wake-up criterion using a first preset adjustable configuration of transmission parameters, and
   the receiver comprises a changeover switch in order to switch to at least one further second configuration different from said first configuration when the first wake-up criterion is not found, and to search for a second wake-up criterion,
   wherein the receiver is operable to switch into an active mode with said first or second configuration, respectively in case of a successful reception of said first or second wake-up criterion.

7. The receiver as claimed in claim 6, wherein the receiver has an active mode that the receiver goes into when reception is successful and a wake-up criterion has been found using the configuration that was successful for the reception concerned.

8. The receiver as claimed in claim 6, wherein the receiver has a time-control unit so that the switchover using the changeover switch occurs within a preset time at the latest.

9. The receiver as claimed in claim 6, wherein a first device is a remote keyless entry system and a second device is a tire pressure monitoring system.

10. A motor vehicle comprising:
    a receiver for receiving first signals and further signals comprising a storage device for loading at least two different pre-definable receive configurations,
    a first device coupled with said receiver;
    a second device coupled with said receiver;
    wherein the receiver is operable to operate in a quiescent mode in which it intermittently is turned on to receive and search for a first wake-up criterion using a first preset adjustable configuration of transmission parameters, and
    wherein the receiver comprises a changeover switch in order to switch to at least a second preset adjustable configuration different from said first preset adjustable configuration when no signal is received and the first wake-up criterion is not found using said first preset adjustable configuration, and to search for a second wake-up criterion, wherein the receiver is operable to switch into an active mode with said first or second preset adjustable configuration, respectively in case of a successful reception of said first or second wake-up criterion.

11. The motor vehicle as claimed in claim 10, wherein the receiver has an active mode that the receiver goes into when reception is successful and a wake-up criterion has been found using the configuration that was successful for the reception concerned.

12. The motor vehicle as claimed in claim 10, wherein the receiver has a time-control unit so that the switchover using the changeover switch occurs within a preset time at the latest.

13. The motor vehicle as claimed in claim 10, wherein said first device is a remote keyless entry system and said second device is a tire pressure monitoring system.

14. The method as claimed in claim 1, wherein during quiescent mode, the receiver is turned on in intervals for receiving said first or second wake-up criterion.

* * * * *